Aug. 31, 1943.      G. E. FLINN      2,328,205
CLUTCH
Filed April 13, 1942      2 Sheets-Sheet 1

Inventor:
George E. Flinn
By Edward C. Fritzbaugh
Atty.

Aug. 31, 1943.   G. E. FLINN   2,328,205
CLUTCH
Filed April 13, 1942   2 Sheets-Sheet 2
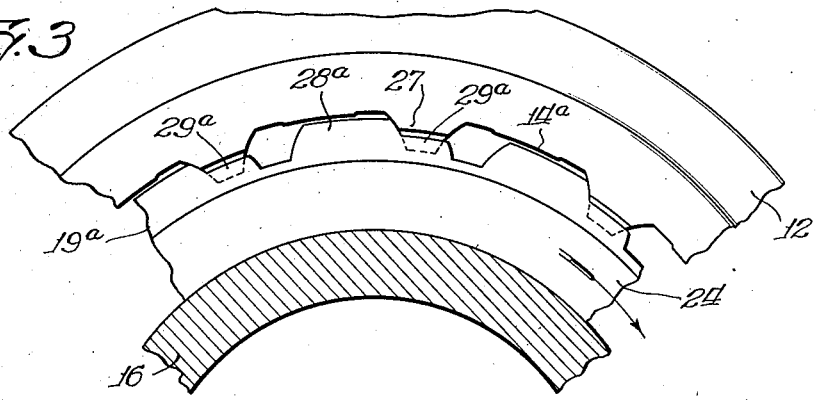
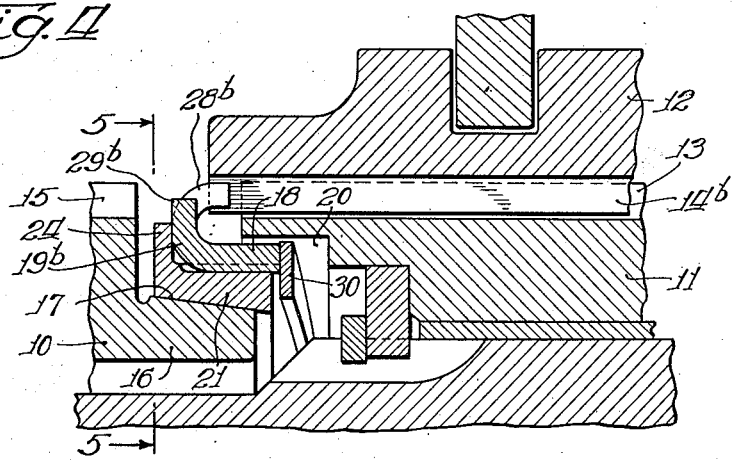
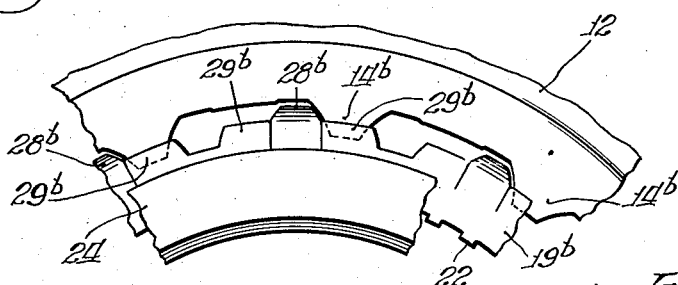
Inventor:
George E. Flinn Patented Aug. 31, 1943

2,328,205

UNITED STATES PATENT OFFICE 2,328,205

CLUTCH

George E. Flinn, Muncie, Ind., assignor to Borg-Warner Corporation, Chicago, Ill., a corporation of Illinois Application April 13, 1942, Serial No. 438,668

12 Claims. (Cl. 192—53)

This invention relates to clutches and has as its general object to provide improved means for preventing the engagement of a jaw clutch while differential rotation exists between the members of said clutch.

Specifically, the invention relates to a jaw clutch of the type including a pair of torque transmitting members to be synchronized having alignable peripheral teeth, and a jaw clutch sleeve meshing with the teeth of one of the members and axially slidable thereon into clutching engagement with the teeth of the other member, a blocker ring being interposed between the sleeve and the jaw clutch element with which it is engageable, to prevent clutching action as long as differential rotation exists, the ring being oscillatable relative to the sleeve from blocking to non-blocking position respectively, and means being provided for limiting such oscillating movement so as to control the blocking position.

A specific object of the invention is to provide a relatively simple and inexpensive blocking mechanism of this general type. In general, this object is attained by utilizing a space between adjacent teeth of the sleeve as a recess into which a lug formed integrally with a radially outwardly extending flange of the blocker ring, is extended to provide the oscillatable lost motion connection between the ring and sleeve, and by forming the blocking element integrally with the same flange in which the lost motion lug is formed. This permits the blocking ring to be easily formed of heavy stamped sheet metal and one of the objects of the invention is to utilize that material so as to reduce cost.

Other objects, the advantages and uses of the invention will become more apparent after reading the following specification and claims, and after consideration of the drawings forming a part of the specification, wherein:

Fig. 3 is a transverse sectional view of a clutch mechanism embodying a modified form of the blocker ring, adapted to block in only one direction;

Fig. 4 is an axial view of a portion of a clutch mechanism embodying another modification of the invention; and Fig. 5 is a transverse sectional view taken as indicated by the line 5—5 of Fig. 4.

Figure 1:
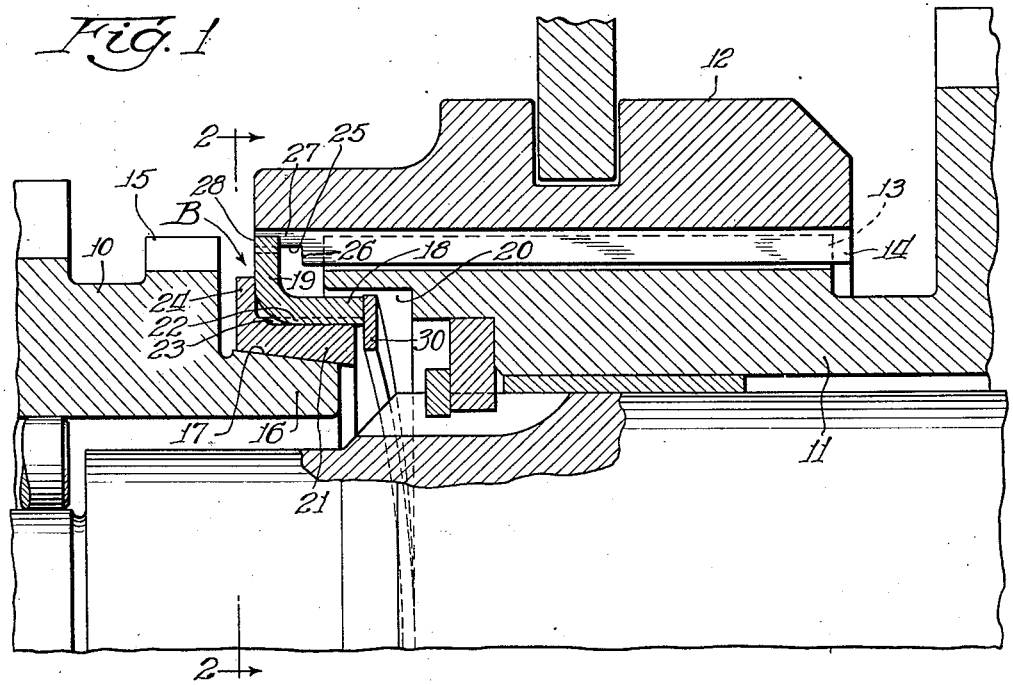
Fig. 1 is an axial sectional view of a portion of a clutch mechanism embodying our invention.

As an example of one form in which the invention may be embodied, we have shown in Fig. 1 a portion of the transmission disclosed in the pending application of J. M. Simpson and H. E. Carnagua, Serial No. 403,196, filed July 19, 1941. In this transmission, drive is adapted to be transmitted from a torque transmitting member 10 to a torque transmitting member 11 through the medium of a jaw clutch sleeve 12. The member 11 has external splines 13 and the sleeve 12 has internal teeth 14 meshing with the splines 13. The sleeve 12 is adapted to be shifted axially to mesh the end portions of the teeth 14 with jaw clutch teeth 15 on the torque transmitting member 10.

The torque transmitting member 10 is provided with a friction clutch element 16 of smaller diameter than the clutch teeth 15 and having a conical external friction clutch face 17. Interposed between the torque transmitting member 11 and the torque transmitting member 10 is a blocker synchronizer B including a blocker ring having a cylindrical collar portion 18 and a radially outwardly extending flange 19. The collar portion 18 is received in an axially extending recess 20 in the torque transmitting member 11. The blocker synchronizer B is provided with a friction facing 21 having an internal friction surface arranged to coact with the friction surface 17 of the element 16. The collar portion 18 of the blocker ring has internal splines 22 press-fitted into grooves 23 in the exterior surface of the facing 21. The facing 21 has a radially outwardly extending flange 24 abutted against the flange 19 of the blocker ring to receive thrust therefrom.

The radially inner extremities or tips of the sleeve teeth 14 are cut away to provide recesses 25, forming shoulders 26 at the ends of said tip portions, with the base portions of the teeth extending axially beyond said shoulders 26 as at 27.

The flange 19 of the blocker ring is provided with a lug or lugs 28 extending into a space or spaces between adjacent base portions 27 of the sleeve teeth. The lugs 28 are of substantially the same cross-sectional dimensions as the teeth 15 and splines 13, and are preferably formed with a tooth outline conforming to that of the teeth 15. The spaces in which the lugs 28 are received are formed by cutting away alternate sleeve teeth as indicated at 14a so as to permit the lugs 28 to oscillate back and forth through an arc having a length approximately three times the width of the lug 28. On either side of each lug 28 is formed, in the flange 19, a blocker element 29 the radially outer limit of which terminates inwardly of the base portion 27 so as to clear the same and permit the blocker-synchronizer to assume positions in which the blocker elements 29 are disposed in blocking relation to the shoulders 26 forming the extremities of the tip portions of the sleeve teeth 14.

Simplicity and reduction in cost is attained by forming the blocker ring of sheet metal, with the lost motion lugs 28 and blocker portions 29 formed integrally in a single flange. The oscillatory lost motion connection between the ring and the sleeve is attained by utilizing the space between adjacent sleeve teeth as a recess for reception of the lost motion lug. The recessing of the ends of the sleeve teeth makes it possible to form the blocker element and lost motion lug integrally in the same plane. The teeth of the sleeve are generated in a conventional manner and the complete removal of alternate sleeve teeth is a relatively simple method of forming recesses of sufficient width to accommodate the oscillating movement of the blocker ring from a neutral, non-blocking position to either of two blocking positions.

In order to maintain the blocking relation at all times except at synchronism, we provide an undulated annular spring 30 which is interposed between the collar portion 18 of the blocker ring and the bottom of the recess 20. The spring 30 maintains a constant engagement between the friction facing 21 and the friction element 16 so that differential rotation between these members will tend to rotate the blocker ring with the driving member 10 at all times, resulting in the maintenance of the blocker-synchronizer at one limit of its oscillating movement.

In the operation of the transmission, when the sleeve 12 is shifted toward clutching engagement with the teeth 15, the shoulders 26 will engage the blocker elements 29 and exert axial pressure thereagainst, causing the friction facing 21 to grip the friction cone 16 tightly and resulting in synchronization of the torque transmitting members. When synchronization occurs, there will be a reversal of the relative directions of rotation of the members, carrying the blocker-synchronizer to a neutral position in which the blocker lugs 29 may be received between adjacent teeth 14 of the sleeve. When this happens, the sleeve may be advanced to its position of clutching engagement with the teeth 15.

The blocking means is adapted to function irrespective of which direction the relative rotation may take. This is to provide for blocking not only under normal conditions in which the driving member 10 is rotating faster than the driven member 11, but also at such times as the driven member may be rotating faster than the driving member, as for example, when coasting down a hill.

In the modified form of the invention shown in Fig. 3, the flange 19a of the blocker ring is provided with a blocking element 29a on only one side of the lost motion lug 28a, and the lug 28a is of twice the normal tooth width, so that the total lost motion is only half that in the preferred form of the invention, accommodating blocking movement in only one direction from the unblocked position.

In the form of the invention shown in Figs. 4 and 5, the blocker ring has the flange 19b thereof formed with pairs of blocker lugs 29b separated by a lost motion lug 28b which is bent axially into a space between adjacent sleeve teeth. In this arrangement, the blocker lugs 29b are adapted to coact with the ends of the unrecessed end of the sleeve teeth 14b. The bending of the lugs 28b axially eliminates the necessity for recessing the ends of the sleeve teeth.

Figure 2:
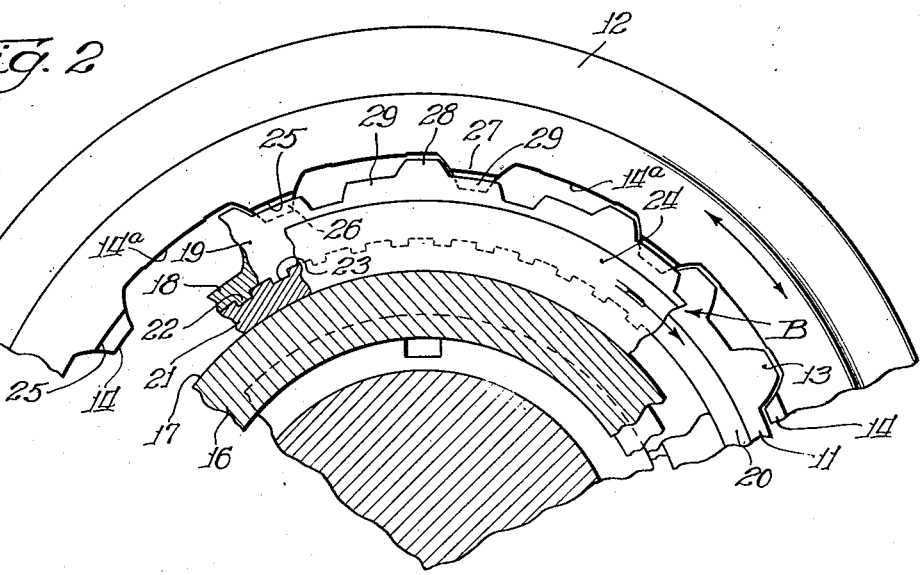
Fig. 2 is a transverse sectional view taken as indicated by the line 2—2 of Fig. 1.

With the exception of the modifications specifically described above, the forms of the invention disclosed in Figs. 3, 4 and 5 are the same as the form shown in Figs. 1 and 2, and the same reference characters have been used to designate the corresponding parts.

I claim:

1. In a clutch mechanism, in combination with a pair of torque transmitting members to be synchronized, each having radially outwardly extending teeth, a jaw clutch sleeve having internal teeth meshing with the teeth of one of said members and axially slidable thereon into clutching engagement with the teeth of the other member, said sleeve teeth having base portions at least one of which extends axially beyond the tip portion thereof to define a corner recess, and a blocker ring having a radially outwardly extending lug received between the base portions of adjacent sleeve teeth to provide for limited oscillating movement of said ring relative to said sleeve, and having a radially outwardly extending blocker element arranged to be received in said recess and to be disposed in blocking relation to the end of said tip portion when said blocker ring is at one limit of said oscillating movement.

2. In a clutch mechanism, in combination with a pair of torque transmitting members to be synchronized, each having radially outwardly extending teeth, a jaw clutch sleeve having internal teeth meshing with the teeth of one of said members and axially slidable thereon into clutching engagement with the teeth of the other member, said sleeve teeth having base portions at least one of which extends axially beyond the tip portion thereof to define a corner recess, a blocker ring having a radially outwardly extending lug received between the base portions of adjacent sleeve teeth to provide for limited oscillating movement of said ring relative to said sleeve, and having a radially outwardly extending blocker element arranged to be received in said recess and to be disposed in blocking relation to the end of said tip portion when said blocker ring is at one limit of said oscillating movement, and means for causing said blocker ring to tend to rotate with said other torque transmitting member so as to maintain said blocking relation as long as differential rotation exists between said members.

3. In a clutch mechanism, in combination with a pair of torque transmitting members to be synchronized, one having radially outwardly extending splines and the other having radially outwardly extending jaw clutch teeth and a friction clutch element, a jaw clutch sleeve having internal teeth meshing with said splines and axially slidable thereon into clutching engagement with said jaw clutch teeth, said sleeve teeth having base portions at least one of which extends axially beyond the tip portion thereof to define a corner recess, and a blocker-synchronizer interposed between said sleeve and said other member, having a friction clutching portion adapted under axial pressure to coact with said friction clutch element for synchronizing said members, having a radially outwardly extending lug received between the base regions of adjacent sleeve teeth to provide for limited oscillating movement of said blocker-synchronizer relative to said sleeve, and having a radially outwardly extending blocker element arranged to be disposed in blocking relation to said tip portion when said blocker-synchronizer is at one limit of said oscillating movement, whereby to receive from said sleeve, axial thrust for developing said synchronizing action, said blocker-element being adapted, in another position of said oscillating movement, to be received between said adjacent teeth so as to permit the sleeve to advance to jaw clutching position, and means for causing said blocker-synchronizer to lightly engage said friction clutch element prior to engagement of said blocker element by said tip portion, so as to establish said blocking relation.

4. In a clutch mechanism, in combination with a pair of torque transmitting members to be synchronized, one having radially outwardly extending splines and the other having radially outwardly extending jaw clutch teeth and a friction clutch element, a jaw clutch sleeve having internal teeth meshing with said splines and axially slidable thereon into clutching engagement with said jaw clutch teeth, said sleeve having base portions at least one of which extends axially beyond the tip portion thereof to define a corner recess, and a blocker-synchronizer interposed between said sleeve and said other member, having a friction clutching portion adapted under axial pressure to coact with said friction clutch element for synchronizing said members, having a radially outwardly extending lug received between the base regions of adjacent sleeve teeth to provide for limited oscillating movement of said blocker-synchronizer relative to said sleeve, and having a radially outwardly extending blocker element, co-planar with said lug and arranged to be disposed in blocking relation to said tip portion when said blocker-synchronizer is at one limit of said oscillating movement, whereby to receive from said sleeve, axial thrust for developing said synchronizing action, said blocker-synchronizer being adapted, in another position of said oscillating movement, to be received between said adjacent teeth so as to permit the sleeve to advance to jaw clutching position, and means for causing said blocker-synchronizer to engage lightly said friction clutch element prior to engagement of said blocker element by said tip portion, so as to establish said blocking relation.

5. A clutch mechanism as defined in claim 1, wherein said lug and blocker element are both formed in a radially outwardly extending flange of said blocker ring.

6. A clutch mechanism as defined in claim 3, wherein said blocker-synchronizer includes a stamped sheet metal blocker ring having a cylindrical portion one axial extremity of which is recessed axially into said one torque transmitting member and a radially outwardly extending flange formed on the other axial extremity thereof, said blocker element and lug being formed side by side in said flange.

7. In a clutch mechanism, in combination with a pair of torque transmitting members to be synchronized, one of said members having radially outwardly extending splines of gear tooth form, with alternate splines removed, and the other having radially outwardly extending jaw clutch teeth, said sleeve teeth having base portions at least one of which extends axially beyond the tip portion thereof to define a corner recess, and a blocker ring having a radially outwardly extending lug of gear tooth dimensions received between the base portions of adjacent sleeve teeth to provide for limited oscillating movement of said ring relative to said sleeve, and having a radially outwardly extending blocker element arranged to be accommodated in said recess, in blocking relation to the end of said tip portion when said blocker ring is at one limit of said oscillating movement, and means for establishing said ring in blocking position.

8. In a clutch mechanism, in combination with a pair of torque transmitting members to be synchronized, one having peripheral splines and the other having radially outwardly extending jaw clutch teeth of substantially the same pitch diameter as said splines and having a friction clutch element disposed radially inwardly of said teeth, a blocker-synchronizer including a friction clutch portion adapted under axial pressure to develop synchronizing engagement with said friction clutch element and including an outwardly extending flange, a lug carried by said flange and extending between adjacent sleeve teeth to provide for limited oscillating movement of said ring relative to said sleeve, a blocker element carried by said flange and arranged to be disposed in blocking relation to an end portion of one of said sleeve teeth when said blocker-synchronizer is at one limit of said oscillating movement, whereby to receive axial thrust from said sleeve to establish said synchronizing engagement, and adapted to pass between adjacent sleeve teeth when the blocker-synchronizer is in another position of said oscillating movement, and means for causing said blocker-synchronizer to tend to rotate with said other member so as to maintain said blocking relation when differential rotation exists between said members.

9. A clutch mechanism as defined in claim 8, wherein said lug extends axially from the plane of said flange and said blocker element lies in said plane.

10. In a clutch mechanism, in combination with a pair of torque transmitting members to be synchronized, each having radially outwardly extending teeth adapted to align with the teeth of the other, a jaw clutch sleeve having internal teeth meshing with the teeth of one of said members and axially slidable thereon into clutching engagement with the teeth of the other member, and a blocker ring of stamped sheet metal having a collar portion one axial extremity of which is axially recessed into said one member and the other axial extremity of which is formed outwardly to provide a flange, a lug formed on said flange and extending between adjacent sleeve teeth to provide for limited oscillating movement of said ring relative to said sleeve, a blocker element likewise formed on said flange and arranged to be disposed in blocking relation to an end portion of one of said sleeve teeth when the ring is at one limit of said oscillating movement, and adapted, in another position of said oscillating movement, to pass between adjacent sleeve teeth so as to permit the sleeve to move into clutching engagement with the teeth of said other member.

11. In a clutch mechanism, in combination with a pair of torque transmitting members to be synchronized, each having radially outwardly extending teeth adapted to align with the teeth of the other, a jaw clutch sleeve having internal teeth meshing with the teeth of one of said members and axially slidable thereon into clutching engagement with the teeth of the other member, and a blocker ring of stamped sheet metal having a collar portion one axial extremity of which is axially recessed into said one member and the other axial extremity of which is formed outwardly to provide a flange of stamped sheet metal, a lug formed on said flange and extending between adjacent sleeve teeth to provide for limited oscillating movement of said ring relative to said sleeve, a blocker element likewise formed on said flange and arranged to be disposed in blocking relation to an end portion of one of said sleeve teeth when the ring is at one limit of said oscillating movement, and adapted, in another position of said oscillating movement, to pass between adjacent sleeve teeth so as to permit the sleeve to move into clutching engagement with the teeth of said other member.

12. In a clutch mechanism, in combination with a pair of torque transmitting members to be synchronized, each having radially outwardly extending teeth, a jaw clutch sleeve having internal teeth meshing with the teeth of one of said members and axially slidable thereon into clutching engagement with the teeth of the other member, and a blocker ring having a lug received in a space between adjacent teeth of said sleeve to provide an oscillatory lost motion drive connection between said ring and sleeve, means for causing said ring to tend to rotate with said other torque transmitting member whereby said ring is indexed to one or the other limits of said lost motion connection depending upon the relative direction of rotation between said torque transmitting members, said ring having a pair of blocking portions one of which is adapted to block advance of said sleeve to clutching position when said one member is rotating more slowly than said other member and the other of which is adapted to block advance of said sleeve to clutching position when said one member is rotating more rapidly than said other member, said blocking portions being arranged one on either side of said lug and said space between adjacent sleeve teeth being sufficiently wide to receive both of said blocking portions when the ring is in an intermediate position, whereby said sleeve is permitted to advance to clutching position, said intermediate position being achieved at synchronism of said members during a change in the direction of relative rotation thereebtween.

GEORGE E. FLINN.